(12) United States Patent
Lee

(10) Patent No.: US 10,974,455 B2
(45) Date of Patent: Apr. 13, 2021

(54) 3D PRINTER

(71) Applicant: LG Chem, Ltd., Seoul (KR)

(72) Inventor: Jin Kyu Lee, Daejeon (KR)

(73) Assignee: LG Chem, Ltd.

(*) Notice: Subject to any disclaimer, the term of this patent is extended or adjusted under 35 U.S.C. 154(b) by 162 days.

(21) Appl. No.: 15/569,942

(22) PCT Filed: May 9, 2016

(86) PCT No.: PCT/KR2016/004790
§ 371 (c)(1),
(2) Date: Oct. 27, 2017

(87) PCT Pub. No.: WO2016/178545
PCT Pub. Date: Nov. 10, 2016

(65) Prior Publication Data
US 2018/0154577 A1 Jun. 7, 2018

(30) Foreign Application Priority Data

May 7, 2015 (KR) .................. 10-2015-0063861
May 9, 2016 (KR) .................. 10-2016-0056080

(51) Int. Cl.
B29C 64/295 (2017.01)
B33Y 70/00 (2020.01)
(Continued)

(52) U.S. Cl.
CPC .......... B29C 64/295 (2017.08); B29C 64/112 (2017.08); B29C 64/393 (2017.08);
(Continued)

(58) Field of Classification Search
None
See application file for complete search history.

(56) References Cited

U.S. PATENT DOCUMENTS 9,228,073 B2 * 1/2016 He .................. C08K 3/36
2004/0151978 A1 8/2004 Huang
(Continued)

FOREIGN PATENT DOCUMENTS

EP 2182787 A1 5/2010
JP 2000094530 A 4/2000
(Continued)

OTHER PUBLICATIONS

Helmholtz Coils, HyperPhysics, http://hyperphysics.phy-astr.gsu.edu/hbase/magnetic/helmholtz.html, Accessed Jul. 24, 2020 (Year: 2004).*

(Continued)

Primary Examiner — Peter L Vajda
Assistant Examiner — Adrianna N Konves
(74) Attorney, Agent, or Firm — Lerner, David, Littenberg, Krumholz & Mentlik, LLP

(57) ABSTRACT

A 3D printer is provided herein. In some embodiments, a 3D printer includes an ink tank for storing ink comprising a magnetic body, an injection nozzle which is linked to the ink tank and is adapted to inject ink, a substrate on which the injected ink is deposited, a heating unit so as to heat the ink coated onto the substrate by means of induction heating, and which is positioned behind the injection nozzle such that injection of ink occurs prior to induction heating of the ink; a carriage unit for changing the positions of the injection nozzle and the heating unit relative to the substrate: and a control unit for controlling the heating unit and the carriage unit.

17 Claims, 3 Drawing Sheets

(51) Int. Cl.
*B33Y 30/00* (2015.01)
*B33Y 50/02* (2015.01)
*B29C 64/112* (2017.01)
*B29C 64/393* (2017.01)
*B29K 505/00* (2006.01)
*B29K 509/02* (2006.01)

(52) U.S. Cl.
CPC ............... *B33Y 30/00* (2014.12); *B33Y 50/02* (2014.12); *B33Y 70/00* (2014.12); *B29K 2505/00* (2013.01); *B29K 2509/02* (2013.01); *B29K 2995/0008* (2013.01)

(56) References Cited

U.S. PATENT DOCUMENTS

2010/0014187 A1* 1/2010 Winarski ................. G11B 5/78
360/75

2010/0171792 A1* 7/2010 Sidhu ....................... H05K 3/12
347/44

2014/0363327 A1 12/2014 Holcomb

FOREIGN PATENT DOCUMENTS

| | | |
|---|---|---|
| JP | 2010500156 A | 1/2010 |
| JP | 201367036 A | 4/2013 |
| JP | 2015476 A | 1/2015 |
| WO | 2007114895 A2 | 10/2007 |

OTHER PUBLICATIONS

Extended European Search Report and Written Opinion for EP Application No. 16789651.3, dated Feb. 21, 2019.

Search report from International Application No. PCT/KR2016/004790, dated Jul. 18, 2016.

* cited by examiner

[Figure 1]
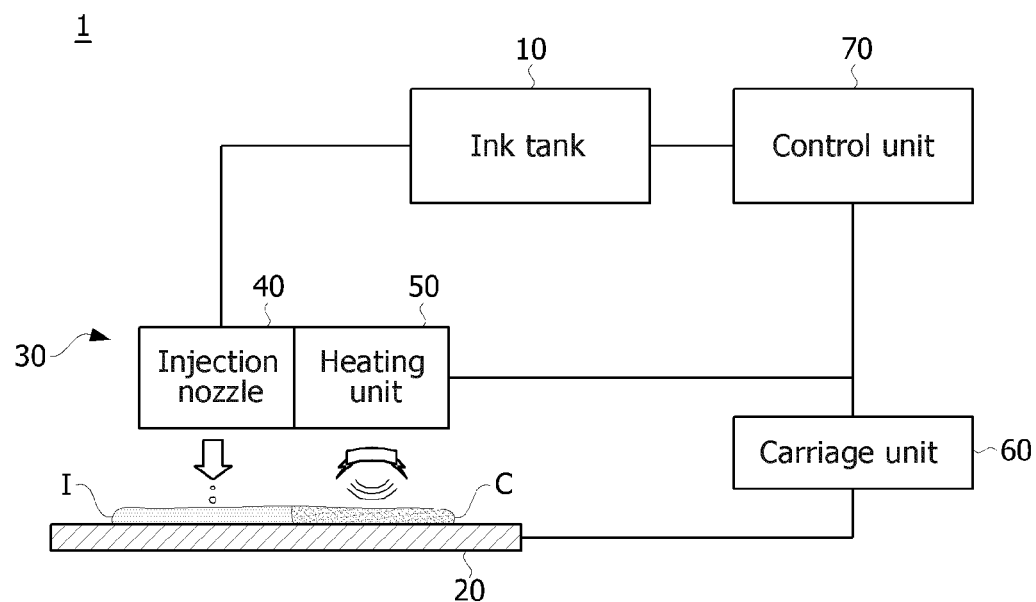
[Figure 2]
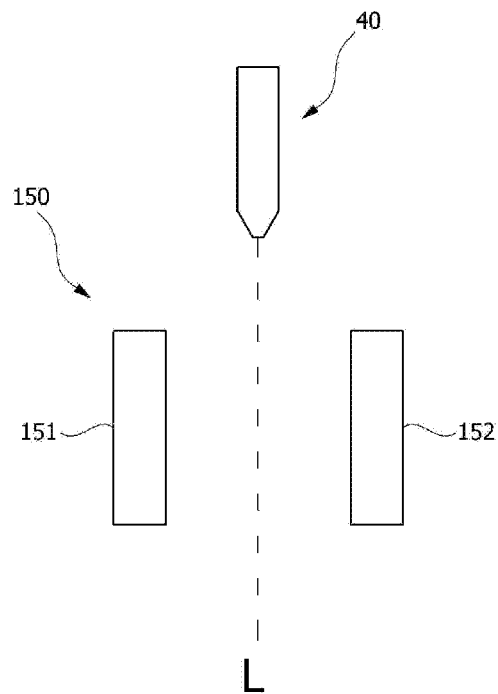

[Figure 3]
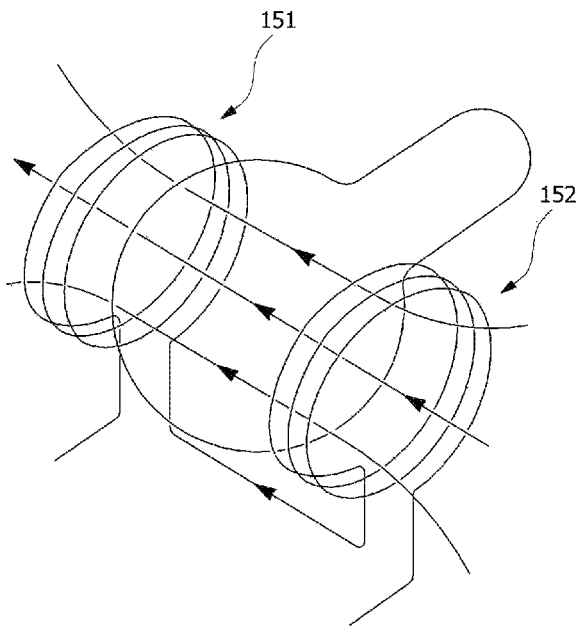
[Figure 4]
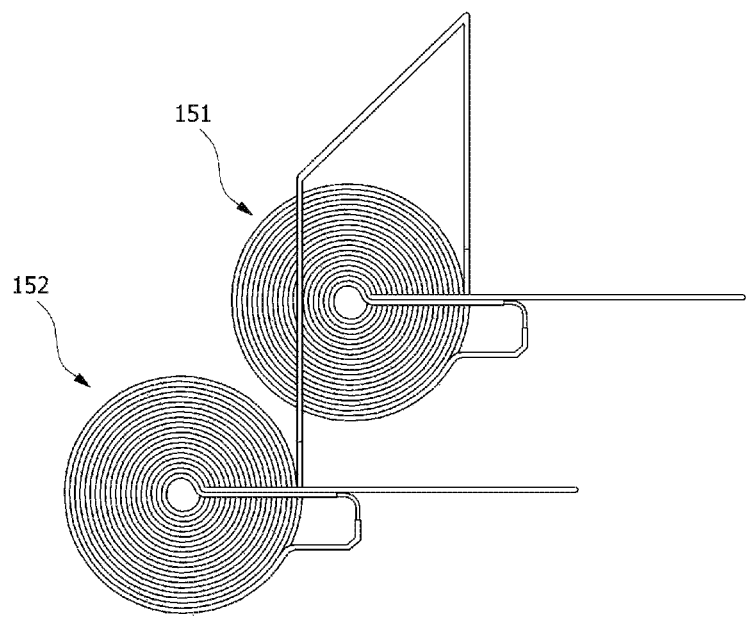

[Figure 5]
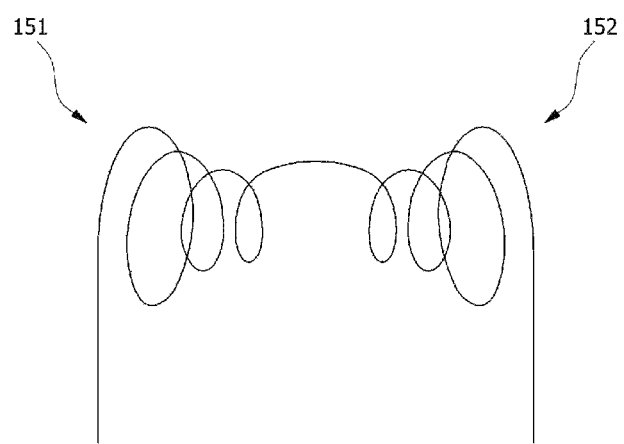

3D PRINTER

The present application is a national phase entry under 35 U.S.C. § 371 of International Application No. PCT/KR2016/004790, filed May 9, 2016, which claims the benefit of Korean Patent Application No. 10-2015-0063861, filed on May 7, 2015, and Korean Patent Application No. 10-2016-0056080, filed on May 9, 2016, the disclosures of which are incorporated herein by reference in their entireties.

TECHNICAL FIELD

The present invention relates to a 3D printer.

BACKGROUND ART

A 3D printer is a printer that outputs objects three-dimensionally and has various printing methods depending on materials of inks.

As the 3D printing method, for example, a method of melting and extruding an ink through a heated print head using a thermoplastic polymer fiber as the ink, or a method of photo-curing an ink through a laser using a photo-curable resin as the ink has been used. However, when the thermoplastic polymer fiber is used as the ink, there is a disadvantage that the resolution is low, and when the photo-curable resin is used as the ink, the resolution is high, but since the optical equipment must be used, there is a disadvantage that the volume of the apparatus becomes large.

In addition, there is a problem that 3D inks are produced in accordance with each printing method, so that there is little interchangeability.

DISCLOSURE

Technical Problem

It is an object to be solved by the present invention to provide a 3D printer capable of inducing thermal curing or thermal fusion of inks through induction heating.

Also, it is another object to be solved by the present invention to provide a 3D printer comprising one or more coil structures positioned behind an injection nozzle and provided so as to be capable of forming a focused alternating electromagnetic field in a region on which the ink is applied.

Also, it is another object to be solved by the present invention to provide a 3D printer capable of adjusting at least one of an interval between an injection nozzle and a substrate and an interval between a heating unit and the substrate, and continuously performing 3D printing.

Technical Solution

To solve the above-described objects, according to one aspect of the present invention, there is provided a 3D printer comprising an ink tank for storing an ink comprising a magnetic body, an injection nozzle connected to the ink tank and for injecting the ink, a substrate on which the injected ink is deposited, a heating unit provided so as to heat the ink coated onto the substrate by means of induction heating and to be positioned behind the injection nozzle based on the direction of carriage of the injection nozzle, a carriage unit for carrying the injection nozzle and the heating unit, and a control unit for controlling the heating unit and the carriage unit.

In addition, the heating unit may be provided to apply an external alternating electromagnetic field to the ink deposited on the substrate.

Furthermore, the heating unit may be provided to form a focused alternating electromagnetic field on the ink deposited on the substrate.

Also, the heating unit may comprise one or more coil structures.

Also, the coil structure may have a cylindrical shape (solenoid), a spiral shape, or a pancake shape.

Also, the coil structure may have a circular or rectangular coil shape.

Also, the heating unit may comprise two coil structures disposed on both sides of the rear, respectively, based on the injection nozzle. At this time, the heating unit may be provided to apply the external alternating electromagnetic field to the ink positioned in the space between the two coil structures.

Also, the heating unit may be disposed to be located at the same height as the injection nozzle, and the heating unit may be disposed to be located at a height different from the injection nozzle. For example, the heating unit may be disposed so as to be located about 1 mm below the injection nozzle.

Also, the heating unit may be provided so that the center line of the nozzle head in the injection nozzle is located between the two coil structures. In particular, the heating unit may be provided such that the two coil structures are symmetrically arranged along the center line of the nozzle head in the injection nozzle.

Also, the nozzle head of the injection nozzle may have a diameter of 100 μm or less, and preferably 10 to 50 μm.

Also, the two coil structures may be provided in a Helmholtz type, a bi-conical type, or a dual pancake type.

Also, the carriage unit may be provided to carry the heating unit and the injection nozzle integrally.

Also, the carriage unit may be provided to carry the heating unit and the injection nozzle individually.

Also, the carriage unit may be provided to carry the heating unit and the injection nozzle at speeds different from each other.

Also, the carriage unit may be provided to adjust the relative position of the heating unit with respect to the substrate.

Also, at least one of the heating unit and the substrate may be provided so as to be movable up and down. For example, the heating unit may be provided so as to be movable up and down with respect to the substrate.

Also, the carriage unit may be provided to adjust the interval between the substrate and the injection nozzle. For example, the injection nozzle may be provided so as to be movable up and down with respect to the substrate.

Also, the control unit may be provided to operate the heating unit while applying the ink. Alternatively, the control unit may be provided to operate the heating unit after a predetermined time has elapsed from the application of the ink.

Also, the magnetic body may comprise metal particles, metal oxides, or alloy particles, having magnetism.

Also, the ink may comprise single molecules, oligomers, or polymers, including a thermosetting group. For example, the ink may comprise a thermosetting polymer.

Also, the ink may comprise ceramic particles, where the ceramic particles may comprise one or more oxides, nitrides, or carbides selected from the group consisting of silicon (Si), aluminum (Al), titanium (Ti), and zirconium (Zr).

Advantageous Effects

As described above, the 3D printer related to at least one embodiment of the present invention has the following effects.

The 3D printer is capable of generating thermal curing or thermal fusion of an ink (or ink composition) through induction heating and is provided so as to be capable of forming a focused alternating electromagnetic field in a region on which the ink is applied.

In addition, the 3D printer is provided so that the interval between at least one of an interval between the injection nozzle and the substrate and an interval between the heating unit and the substrate is adjustable, and capable of continuously 3D printing.

BRIEF DESCRIPTION OF DRAWINGS

FIG. 1 is a configuration diagram showing a 3D printer related to one embodiment of the present invention.

FIGS. 2 to 5 are conceptual diagrams showing various embodiments of the heating unit related to the present invention.

MODE FOR INVENTION

Hereinafter, a 3D printer according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a configuration diagram showing a 3D printer related to one embodiment of the present invention, and FIGS. 2 to 5 are conceptual diagrams showing various embodiments of the heating unit related to the present invention.

The ink may mean hereby an ink composition that can be thermally fused or thermally cured by induction heating, and the term such as ink or ink composition may be used together in the same sense.

Referring to FIG. 1, the 3D printer (1) related to one embodiment of the present invention comprises an ink tank (10) in which an ink (I) containing a magnetic body is stored and an injection nozzle (40) connected to the ink tank (10) and for injecting the ink. The 3D printer (1) also comprises a substrate (20) on which the injected ink is deposited and a heating unit (50) provided so as to heat the ink coated onto the substrate (20) through induction heating and to be positioned behind the injection nozzle (40) based on the direction of carriage of the injection nozzle (40). The 3D printer (1) also comprises a carriage unit (60) for carrying the injection nozzle (40) and the heating unit (50). The 3D printer (1) also comprises a control unit (70) for controlling the heating unit (50) and the carriage unit (50).

In addition, the heating unit (50) is provided to apply an external alternating electromagnetic field to the ink composition (C) deposited on the substrate (20). Specifically, the ink composition (C) can be heated while the induction heating is generated by the electromagnetic field.

Here, as described below, in the ink composition (C), the thermosetting resin can be cured or the metal particles can be thermally fused, depending on the composition, whereby the three-dimensional printing can proceed. Referring to FIG. 1, for convenience of explanation, the ink injected from the injection nozzle (40) is indicated by the letter I and the ink heated through the heating unit (50) is indicated by the letter C.

Also, the external alternating electromagnetic field may have a frequency of 100 kHz to 1 GHz and a current of 5 A to 500 A. When the frequency and the current are applied within the above range, the ink composition can be completely cured within about 10 seconds to 1 hour.

Referring to FIG. 1, the heating unit (50) may be provided to form a focused alternating electromagnetic field on the ink composition (C) deposited on the substrate (20). In addition, the heating unit (50) may comprise one or more coil structures. Here, the coil structure may have various structures such as a circular shape, a polygonal shape, and a spiral shape. Furthermore, the coil structure can be used for surface heating, inner surface heating, flat plate heating, and the like. Also, the shape and number of the coil structure, and the arrangement between the coil structures can be variously determined. For example, the coil structure may have a cylindrical shape, a spiral shape, or a pancake shape. Also, the coil structure may have a circular or rectangular coil shape.

In addition, the heating unit (50) may be disposed adjacent to the injection nozzle (40). The heating unit (50) is also provided to be positioned behind the injection nozzle (40), based on the direction of carriage of the injection nozzle (40). Specifically, as the heating unit (50) is provided at the rear of the direction of carriage of the injection nozzle (40), the injection of the ink through the injection nozzle (40) and the heating of the ink through the heating unit (50) can be performed simultaneously or sequentially.

In the above arrangement, the carriage unit (60) may be provided to carry the heating unit (50) and the injection nozzle (40) integrally. At this time, the heating unit (50) and the injection nozzle (40) can be carried at the same speed. Alternatively, the carriage unit (60) may be provided to carry the heating unit (50) and the injection nozzle (40) individually. At this time, the heating unit (50) and the injection nozzle (40) may be provided to be carried at speeds different from each other. The carriage unit may comprise a driving source such as a motor and may be constituted by a known element used for carrying the ink nozzle in the printer technology field.

Meanwhile, the carriage unit (60) may be provided to adjust the interval between the substrate (20) and the heating unit (50). For example, the heating unit (50) may be provided so as to be movable up and down with respect to the substrate (20). Alternatively, the substrate (20) may be provided so as to be movable up and down with respect to the heating unit (50). That is, the carriage unit (60) may be provided to adjust the relative position of the heating unit (50) with respect to the substrate (20), and at least one of the heating unit (50) and the substrate (20) may be provided to be movable up and down. In addition, the carriage unit (60) may be provided to adjust the interval between the substrate (20) and the injection nozzle (40).

Furthermore, the control unit (70) may be provided to operate the heating unit (50) while applying the ink (I). Alternatively, the control unit (70) may be provided to operate the heating unit (50) after a predetermined time has elapsed from the application of the ink.

Referring to FIG. 2, the heating unit (150) may comprise two coil structures (151, 152) disposed on both sides of the rear, respectively, base on the injection nozzle (40). In addition, the heating unit (150) may be provided to apply an external alternating electromagnetic field to the ink positioned in the space between the two coil structures (151, 152). The heating unit (150) may also be provided so that the center line (L) of the nozzle head in the injection nozzle (40) is located between the two coil structures (151, 152). For example, the two coil structures (151, 152) may be provided in the Helmholtz type (see FIG. 3), the dual pancake type (see FIG. 4), or the bi-conical type (see FIG. 5).

Hereinafter, the ink (ink composition) as described hereby will be specifically described.

The magnetic body may comprise metal particles, metal oxides, ferrite, or alloy particles, having ferromagnetism.

In addition, the magnetic body may comprise magnetic nanoparticles.

For example, the ink composition (I) may comprise a thermosetting polymer and magnetic nanoparticles. By applying an external alternating electromagnetic field to the ink composition (I), a magnetic field is formed in the magnetic nanoparticles, whereby the thermosetting polymer can be cured by the generated heat. Therefore, the ink composition (I) can also be cured only by applying an external alternating electromagnetic field instead of curing by the direct heat.

Furthermore, the kind of monomers or oligomers in the thermosetting polymer is not particularly limited, but one or more selected from the group consisting of a monomer of an epoxy resin, a monomer of a phenol resin, a monomer of an amino resin, a monomer of an unsaturated polyester resin, a monomer of an acrylic resin, a monomer of a maleimide resin and a monomer of a cyanate resin can be used, and preferably one or more selected from the group consisting of a monomer of an epoxy resin, a monomer of an acrylic resin and a monomer of a maleimide resin can be used.

The monomer or oligomer of the thermosetting polymer may also be contained in an amount of 80 to 99 parts by weight, relative to the total weight of the ink composition.

On the other hand, the magnetic nanoparticles have a diameter of 1 to 999 nm, preferably a diameter of 30 to 300 nm, more preferably a diameter of 50 to 100 nm, and still more preferably a diameter of 50 to 60 nm. Here, if the diameter of the magnetic nanoparticles exceeds the nano size, the ink composition may not be able to ensure dispersibility. In addition, the magnetic nanoparticles may be one or more selected from the group consisting of $Fe_3O_4$, $Fe_2O_3$, $MnFe_2O_4$, $CoFe_2O_4$, Fe, CoPt, and FePt.

In addition, the ink composition (I) may comprise 80 to 99 parts by weight of the thermosetting polymer and 1 to 20 parts by weight of the magnetic nanoparticles, relative to the total weight. If the content of the magnetic nanoparticles is less than 1 part by weight, the time for curing the ink composition becomes longer, and if the content of the magnetic nanoparticles exceeds 20 parts by weight, the color of the cured resin may become much darker due to blackish magnetic nanoparticles. Also, as an aggregation phenomenon of the magnetic nanoparticles may occur, voids in the cured resin may also be caused, whereby cracking may also be caused.

Furthermore, the ink composition may further comprise one or more selected from the group consisting of a curing agent and a cross-linking agent. The type of the curing agent is not particularly limited, but for example, one or more selected from the group consisting of organic peroxides, hydroperoxides, azo compounds, imidazoles, aliphatic amines, aromatic amines, tertiary amines, polyamide resins, phenol resins and acid anhydrides can be used. The curing agent may be included in an amount of 1 to 10 parts by weight, and preferably 1 to 5 parts by weight, relative to the total weight of the ink composition. If the content of the curing agent is less than 1 part by weight, it may take a long time to completely cure the ink composition, and if it is more than 10 parts by weight, a large amount of polymer having a short chain length may be generated to reduce thermal stability of the cured resin.

Also, the kind of the cross-linking agent is not particularly limited, but for example, one or more selected from the group consisting of phenol novolac resins, phenol alkyl resins, allylated phenol novolac resins and microcapsule type cross-linking agent can be used. By further using the cross-linking agent, hardness and thermal stability of the ink composition can be increased. The cross-linking agent may be included in an amount of 1 to 10 parts by weight, relative to the total weight of the ink composition, where if the content of the cross-linking agent is less than 1 part by weight, cross-linking is not sufficiently carried out and thus the polymer may be melted at a high temperature and flow, and expansion due to the solvent may occur, and if it is more than 10 parts by weight, cross-linking is excessively large and thus the cured resin may be in a fragile state.

Meanwhile, the injection nozzle (40) connected to the ink tank (10) and the heating unit (50) for applying an external alternating electromagnetic field to the ink composition so as to form thermal curing can constitute the printer head (30). At this time, the above-described carriage unit (60) adjusts the relative position of the printer head (30) with respect to the substrate (20).

In addition, the control unit (70) is provided to control the carriage unit (60) and the print head (30). Also, the control unit (70) can control to form the injection of the ink composition (I) and the generation of the external alternating electromagnetic field simultaneously.

The carriage unit (60) may be configured as a conventional carriage unit for carrying the nozzle head from the printer. For example, the carriage unit (60) may comprise a rail part according to the injection trajectory and one or more motors for moving the printer head (30) on the rail part. In addition, the carriage unit (60) may comprise one or more motors (e.g., step motors) for raising and lowering the printer head (30) and/or the substrate (20).

In addition, the ink composition related to the present invention may comprise micro-sized metal particles and additives (for example, organic components). In this case, the metal particles are thermally fused through induction heating, so that the 3D printing may proceed. To summarize, the ink composition may also comprise a thermosetting resin and magnetic nanoparticles (thermosetting resin ink), or may also comprise metal particles and additives (metallic ink). In the case of the thermosetting resin ink, the thermosetting polymer is included as the main component, based on the total weight of the ink composition, and the magnetic nanoparticles are included as the auxiliary component, whereas in the case of the metallic ink, micro-sized metal particles are included as the main component. Particularly, in the case of the metallic ink, it is possible to remove additive components through the process of thermally fusing metal particles via induction heating.

Furthermore, the magnetic particles may comprise metal oxide, ferrite or alloy particles. The metal oxide may also comprise one or more oxides selected from the group consisting of iron (Fe), cobalt (Co), nickel (Ni), chromium (Cr), yttrium (Y), samarium (Sm) and gadolinium (Gd).

Also, the ferrite comprises MO.Fe$_2$O$_3$, where M may be a divalent metal ion. In addition, the divalent metal ion may comprise manganese, iron, cobalt, nickel or zinc. Also, the alloy particles may comprise FePt, CoPt, Ni—Zn or Mn—Zn.

Also, the ink may comprise ceramic particles. Specifically, the ceramic may comprise one or more oxides, nitrides, or carbides selected from the group consisting of silicon (Si), aluminum (Al), titanium (Ti) and zirconium (Zr). In addition, the ink may comprise inorganic particles and ceramic particles, having a core-shell structure. At this time, the shell may comprise ceramic. Also, the core may comprise a magnetic body or a metal powder and the core may comprise one or more oxides selected from the group consisting of iron (Fe), cobalt (Co), nickel (Ni), chromium (Cr), yttrium (Y), samarium (Sm) and gadolinium (Gd).

In addition, the composition may comprise a ceramic sol solvent. Accordingly, the composition may be a ceramic sol solution. In this case, the uniform thermal curing can be performed by generating heat from the magnetic body or the metal powder uniformly dispersed in the composition, and the strength of the finally cured product can be increased by accompanying the curing of the ceramic particles together with the curing of the ceramic sol. The curing may be performed by sintering between the ceramic materials, without being limited thereto, and the curing of the composition may proceed with the curable resin as described below.

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

The 3D printer related to the present invention is capable of generating thermal curing or thermal fusion of an ink (or ink composition) through induction heating and is provided so as to be capable of forming a focused alternating electromagnetic field in a region on which the ink is applied.

The invention claimed is:

1. A 3D printer, consisting of:
an ink tank for storing an ink, the ink comprising a magnetic body;
an injection nozzle connected to the ink tank and for injecting the ink, the injection nozzle having a nozzle head;
a substrate on which the injected ink is deposited;
a heating unit provided so as to heat the ink coated onto the substrate by means of induction heating and is positioned behind the injection nozzle such that injection of the ink occurs prior to induction heating of the ink;
a carriage unit for changing the positions of the injection nozzle and the heating unit relative to the substrate; and
a control unit for controlling the heating unit and the carriage unit,
wherein the heating unit comprises two coil structures disposed at the rear of the injection nozzle based on the direction of movement of the carriage unit, wherein the two coil structures are disposed on opposing sides of the injection nozzle and vertically offset from a center line of the nozzle, the two coil structures having a common central axis, the central axis oriented in a horizontal direction, and wherein the heating unit is capable of applying an external alternating electromagnetic field to the ink positioned in the space between the two coil structures, wherein electromagnetic field lines of the external alternating electromagnetic field extends in the horizontal direction in the space between the two coil structures and on opposing sides of the two coil structures opposite the space.

2. The 3D printer according to claim 1, wherein the heating unit is capable of applying an external alternating electromagnetic field to the ink deposited on the substrate.

3. The 3D printer according to claim 2, wherein the heating unit is capable of forming a focused alternating electromagnetic field on the ink deposited on the substrate.

4. The 3D printer according to claim 2, wherein each coil structure has a cylindrical shape, a spiral shape, or a pancake shape.

5. The 3D printer according to claim 2, wherein each coil structure has a circular or rectangular coil shape.

6. The 3D printer according to claim 1, wherein the two coil structures are a Helmholtz type, a bi-conical type, or a dual pancake type.

7. The 3D printer according to claim 1, wherein the carriage unit is configured to move the heating unit and the injection nozzle integrally.

8. The 3D printer according to claim 1, wherein the carriage unit is configured to move the heating unit and the injection nozzle individually.

9. The 3D printer according to claim 8, wherein the carriage unit is configured to move the heating unit and the injection nozzle at speeds different from each other.

10. The 3D printer according to claim 1, wherein the carriage unit is configured to adjust the relative position of the heating unit with respect to the substrate.

11. The 3D printer according to claim 10, wherein the carriage unit is configured to adjust the position of at least one of the heating unit or the substrate in a vertical direction.

12. The 3D printer according to claim 1, wherein the carriage unit is configured to adjust an interval between the substrate and the injection nozzle.

13. The 3D printer according to claim 1, wherein the control unit is configured to operate the heating unit while applying the ink.

14. The 3D printer according to claim 1, wherein the control unit is configured to operate the heating unit after a predetermined time has elapsed from the application of the ink.

15. The 3D printer according to claim 1, wherein the magnetic body comprises metal particles, metal oxides, or alloy particles, having magnetism.

16. The 3D printer according to claim 1, wherein the ink comprises single molecules, oligomers, or polymers, including a thermosetting group.

17. The 3D printer according to claim 1, wherein the ink comprises ceramic particles, and the ceramic particles comprise one or more oxides, nitrides or carbides selected from the group consisting of silicon (Si), aluminum (Al), titanium (Ti) and zirconium (Zr).

* * * * *